US010253752B2

(12) United States Patent
Caruso et al.

(10) Patent No.: US 10,253,752 B2
(45) Date of Patent: Apr. 9, 2019

(54) ROTOR BLADE COMPONENTS FORMED FROM DISSIMILAR THERMOPLASTICS AND METHODS OF ASSEMBLING SAME

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 14/835,845

(22) Filed: Aug. 26, 2015

(65) Prior Publication Data

US 2017/0058862 A1 Mar. 2, 2017

(51) Int. Cl.
*F03D 1/06* (2006.01)
*B29C 65/00* (2006.01)
(Continued)

(52) U.S. Cl.
CPC .......... *F03D 1/0675* (2013.01); *B29C 66/712* (2013.01); *B29K 2101/12* (2013.01);
(Continued)

(58) Field of Classification Search
CPC ............. B29C 66/712; B29C 65/0681; B29K 2101/12; B29K 2105/08; B29L 2031/085;
(Continued)

(56) References Cited

U.S. PATENT DOCUMENTS 6,264,877 B1 7/2001 Pallu De La Barriere
8,317,479 B2 11/2012 Vronsky et al.
(Continued)

FOREIGN PATENT DOCUMENTS

CN 101906251 B 6/2013
IN 201006838 P1 10/2009
(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

*Primary Examiner* — Mark A Laurenzi
*Assistant Examiner* — Paul W Thiede
(74) *Attorney, Agent, or Firm* — Dority & Manning, P.A.

(57) ABSTRACT

A rotor blade for a wind turbine may generally include a first blade component formed from a first fiber-reinforced composite including a first thermoplastic resin material and a second blade component configured to be coupled to the first blade component at a joint interface. The second blade component may be formed from a second fiber-reinforced composite including a second thermoplastic resin material, wherein the second thermoplastic resin material differs from the first thermoplastic resin material. The rotor blade may also include an additional layer(s) of thermoplastic resin material positioned on or integrated into the second fiber-reinforced composite at the joint interface that differs from the second thermoplastic resin material. Moreover, the first thermoplastic resin material of the first fiber-reinforced composite may be welded to the additional layer(s) of the thermoplastic resin material to form a welded joint at the joint interface between the first and second blade components.

21 Claims, 10 Drawing Sheets (51) Int. Cl.
*B29K 101/12* (2006.01)
*B29K 105/08* (2006.01)
*B29L 31/08* (2006.01)

(52) U.S. Cl.
CPC ..... *B29K 2105/08* (2013.01); *B29L 2031/085* (2013.01); *F05B 2280/6003* (2013.01); *F05B 2280/6015* (2013.01); *Y02E 10/721* (2013.01)

(58) Field of Classification Search
CPC ............ F03D 1/0675; F05B 2280/6003; F05B 2280/6015; Y02E 10/721
USPC ......................................... 416/226; 156/73.5
See application file for complete search history.

(56) References Cited

U.S. PATENT DOCUMENTS

| | | |
|---|---|---|
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,961,142 B2 | 2/2015 | Wansink |
| 8,992,813 B2 | 3/2015 | Robbins et al. |
| 2006/0083907 A1* | 4/2006 | Bech ................. B29C 66/1162 428/212 |
| 2009/0148300 A1 | 6/2009 | Driver et al. |
| 2013/0164133 A1 | 6/2013 | Grove-Nielsen |
| 2014/0295187 A1 | 10/2014 | Jacobsen et al. |

FOREIGN PATENT DOCUMENTS

| | | |
|---|---|---|
| JP | 2007092716 A | 4/2007 |
| WO | WO2010/025830 A2 | 3/2010 |
| WO | WO2011/088835 A2 | 7/2011 |
| WO | WO2011/098785 A2 | 8/2011 |
| WO | WO2015/015202 A1 | 2/2015 |

\* cited by examiner

ROTOR BLADE COMPONENTS FORMED FROM DISSIMILAR THERMOPLASTICS AND METHODS OF ASSEMBLING SAME

FIELD OF THE INVENTION

The present subject matter generally relates to wind turbine rotor blades and, more particularly, to rotor blade components formed from dissimilar thermoplastics and methods of assembling such rotor blade components.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each rotor blade of a wind turbine typically includes a suction side shell and a pressure side shell formed using molding processes that are subsequently bonded together via adhesives at bond lines along the leading and trailing edges of the blade. The pressure and suction side shells are relatively lightweight and have structural properties (e.g., stiffness, buckling resistance and strength) that are not configured to withstand the bending moments and other loads exerted on the rotor blade during operation. Thus, to increase the stiffness, buckling resistance and strength of the rotor blade, the shells are typically reinforced using one or more structural components (e.g. opposing spar caps with a shear web configured therebetween) that engage the pressure and suction side inner surfaces of the shell halves. The spar caps are typically constructed of various materials, including but not limited to fiber-reinforced laminate composites including a thermoset resin. The shells of the rotor blade are generally built around the spar caps by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or adhesive along the bond line with a minimum designed bond width between the shell members. These bonding lines are an important design constraint of the blades as a significant number of turbine blade field failures occur at the bond-line. Separation of the bond line along the leading and/or trailing edges of an operational turbine blade can result in a catastrophic failure and damage to the wind turbine.

In addition, the methods used to manufacture the rotor blades and/or structural components thereof can be difficult to control, defect prone, and/or highly labor intensive due to handling of the dry fabrics and the challenges of infusing large laminated structures. Moreover, as rotor blades continue to increase in size, conventional manufacturing methods continue to increase in complexity as the blade halves are typically manufactured using opposing mold halves that must be large enough to accommodate the entire length of the rotor blade. As such, joining the large blade halves can be highly labor intensive and more susceptible to defects.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade. However, known joint designs for connecting the blade segments together typically have a variety of disadvantages. For example, many known joint designs require complex interconnecting components and do not provide for sufficient alignment of the blade segments, thereby increasing the amount of time needed to assemble the blade segments. In addition, segmented blades are typically heavier than conventional blades due to the additional joints and/or related parts.

Thus, the art is continuously seeking new and improved rotor blades and related assembly methods that address one or more of the aforementioned issues. Accordingly, improved wind turbine rotor blade components that can be easily and effectively assembled would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a first blade component formed from a first fiber-reinforced composite including a first matrix material, wherein the first matrix material primarily corresponds to a first thermoplastic resin material. The rotor blade may also include a second blade component configured to be coupled to the first blade component at a joint interface. The second blade component may be formed from a second fiber-reinforced composite including a second matrix material, wherein the second matrix material primarily corresponds to a second thermoplastic resin material and wherein the second thermoplastic resin material differs from the first thermoplastic resin material. In addition, the rotor blade may include at least one additional layer of thermoplastic resin material positioned on the second fiber-reinforced composite or integrated into the second fiber-reinforced composite at the joint interface, with the additional layer(s) of the thermoplastic resin material differing from the second thermoplastic resin material. Moreover, the first thermoplastic resin material of the first fiber-reinforced composite may be welded to the additional layer(s) of the thermoplastic resin material to form a welded joint at the joint interface between the first blade component and the second blade component.

In another aspect, the present subject matter is directed to a rotor blade for a wind turbine. The rotor blade may generally include a first blade component formed from a first fiber-reinforced composite including a first matrix material, wherein more than 80% of the first matrix material corresponds to a first thermoplastic resin material. The rotor blade may also include a second blade component configured to be coupled to the first blade component at a joint interface. The second blade component may be formed from a second fiber-reinforced composite including a second matrix material, wherein more than 80% of the second matrix material corresponds to a second thermoplastic resin material and wherein the second thermoplastic resin material has a different resin chemistry than the first thermoplastic resin material. In addition, the rotor blade may include at least one additional layer of the first thermoplastic resin material positioned on the second fiber-reinforced composite or integrated into the second fiber-reinforced composite at the joint interface, with the additional layer(s) of the thermoplastic resin material differing from the second thermoplastic resin material. Moreover, the first thermoplastic resin material of the first fiber-reinforced composite may be welded to the additional layer(s) of the thermoplastic resin material to form a welded joint at the joint interface between the first blade component and the second blade component.

In a further aspect, the present subject matter is directed to a method for assembling a rotor blade. The method may generally include positioning a first blade component adjacent to a second blade component at a joint interface to be defined between the first and second blade components. The first blade component may be formed from a first fiber-reinforced composite including a first matrix material that primarily corresponds to a first thermoplastic resin material. The second blade component may be formed from a second fiber-reinforced composite including a second matrix material that primarily corresponds to a second thermoplastic resin material, wherein the second thermoplastic resin material differs from the first thermoplastic resin material. The method may also include welding a portion of the first thermoplastic resin material of the first fiber-reinforced composite to at least one additional layer of thermoplastic resin material positioned on the second fiber-reinforced composite or integrated into the second fiber-reinforced composite at the joint interface so as to form a welded joint at the joint interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to wind turbine rotor blade components formed from dissimilar thermoplastics. Specifically, in several embodiments, blade components that are designed to be coupled to one another at one or more interfaces may be formed primarily from thermoplastic resin materials having different resin chemistries. As such, the differing thermoplastics may prevent the blade components from being effectively coupled together via thermoplastic welding (e.g., due to the differing resin chemistry of each thermoplastic). Thus, to address this issue, the present subject matter is directed to providing a thermoplastic resin material at the interface between the two blade components that is compatible with the thermoplastic(s) used to form one or both of the blade components, thereby allowing a welded joint to be formed between the blade components. Such welding of the thermoplastic material(s) provides a very effective and efficient means for coupling the blade components together.

For instance, in one embodiment, a first blade component may be formed primarily from a fiber-reinforced composite that includes a matrix material corresponding to a first thermoplastic resin (e.g., a methacrylate-based resin) and a second blade component may be formed from a fiber-reinforced composite that includes a matrix material corresponding to a second thermoplastic resin (e.g., a PET-based resin). In such an embodiment, to allow for a welded connection to be achieved between the first and second blade components, one or more layers of the first or second thermoplastic resin material (or a different thermoplastic resin material that is compatible with the first and/or second thermoplastic resin material) may be provided at the interface between the blade components. For instance, one or more layers of the first thermoplastic resin material may be coated onto or otherwise applied to the exterior of the second blade component to provide a common thermoplastic resin material at the interface for welding the blade components together. In another embodiment, one or more layers of the first thermoplastic resin material may be integrated into the second blade component (e.g., by co-infusing the first thermoplastic resin material into a specific portion of the second blade component that will be located at the interface) to allow for the blade components to be welded together. The additional layer(s) of the thermoplastic resin material may correspond to pure resin or may be fiber-reinforced.

It should be appreciated that the thermoplastic resin materials described herein differ from conventional thermoset resin materials. Specifically, as used herein, thermoplastic materials generally encompass a plastic material or polymer that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, examplary amorphous thermoplastic materials may include polystyrene, acrylonitrile butadiene styrene (ABS), polymethyl methacrylate (PMMA), polyethylene terephthalate glycol-modified (PETG), polycarbonate, polyvinyl acetate, amorphous polyamide, polyvinyl chlorides (PVC), polyvinylidene chloride, polyurethane, or any other suitable amorphous thermoplastic material. In addition, examplary semi-crystalline thermoplastic materials may generally include, but are not limited to, polyolefins, polyamides, fluropolymer, ethyl-methyl acrylate, polyesters, polycarbonates, and/or acetals. More specifically, example semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. In contrast, thermoset materials generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies and/or similar materials.

Figure 1:
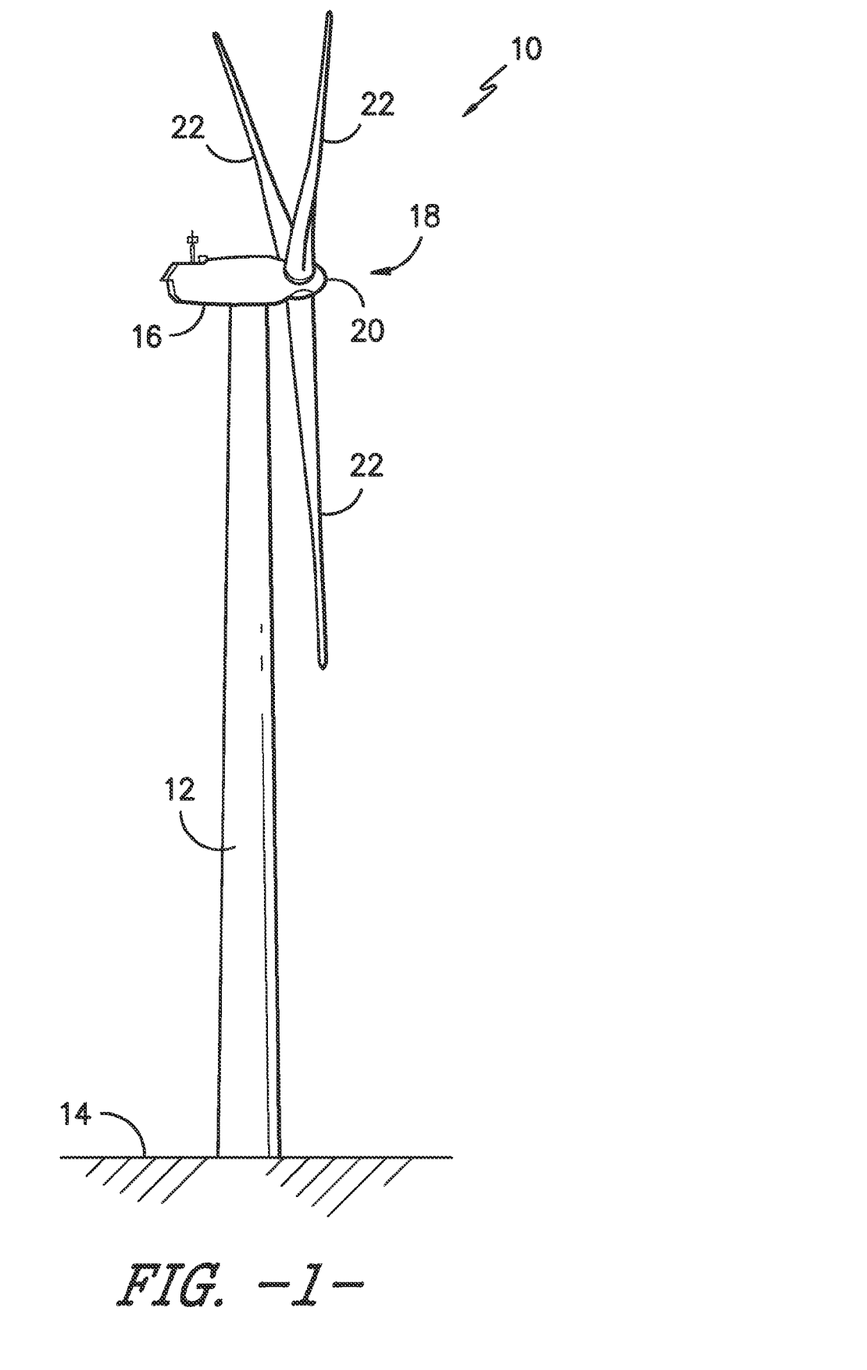
FIG. 1 illustrates a side view of one embodiment of a wind turbine in accordance with aspects of the present subject matter.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
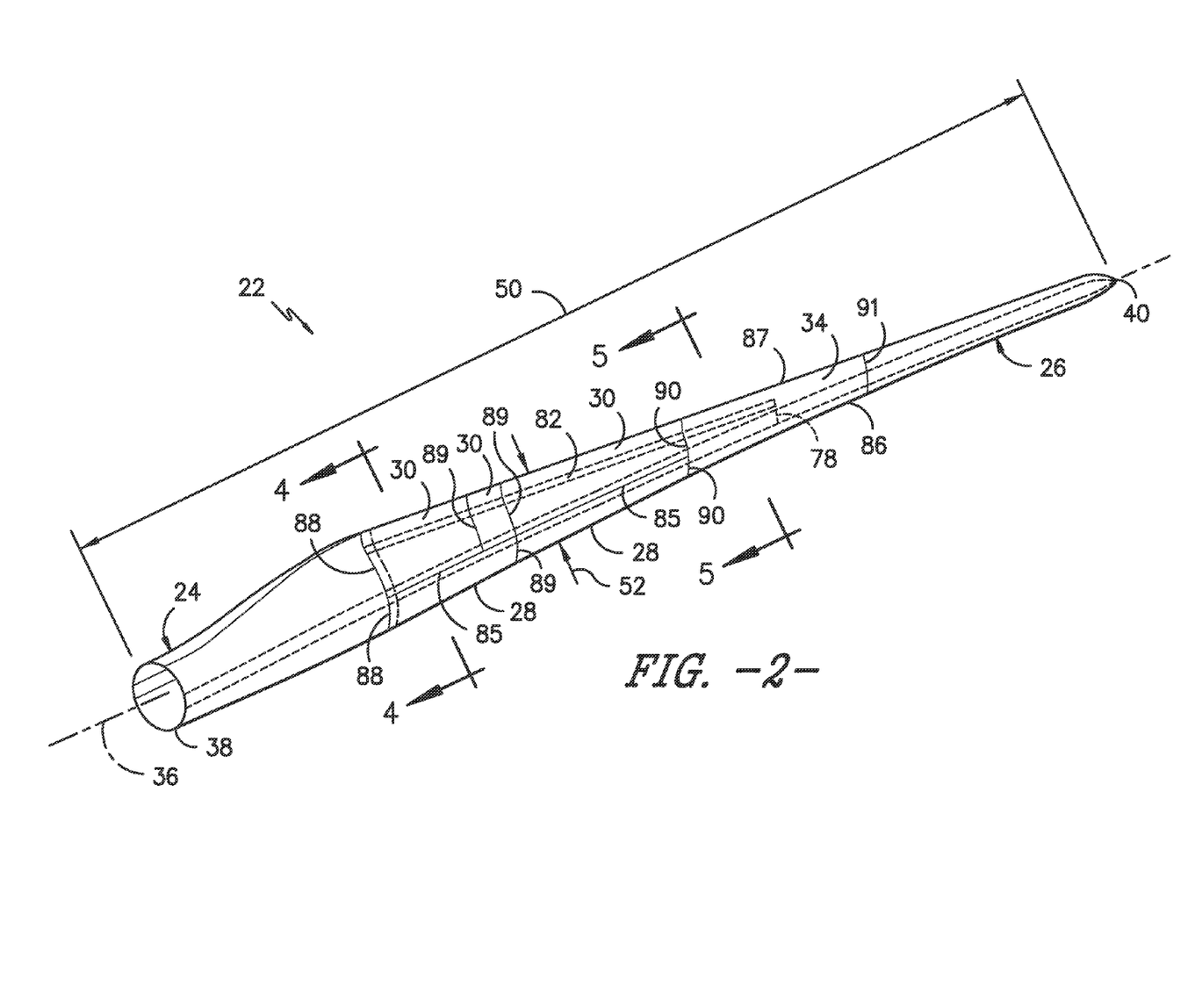
FIG. 2 illustrates a perspective, assembled view of one embodiment of a modular rotor blade in accordance with aspects of the present subject matter.
Figure 3:
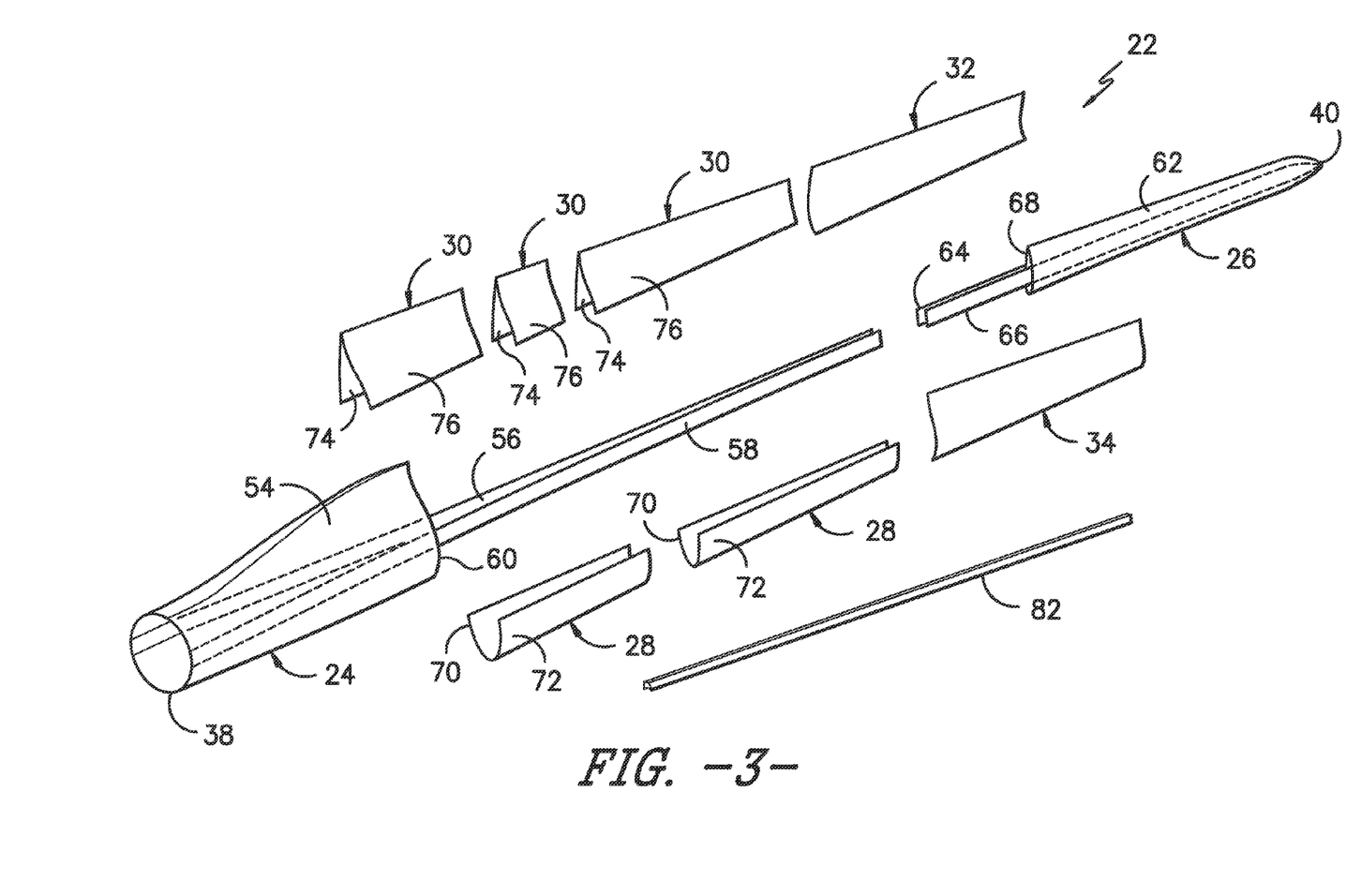
FIG. 3 illustrates a perspective, exploded view of the modular rotor blade shown in FIG. 2.
Figure 4:
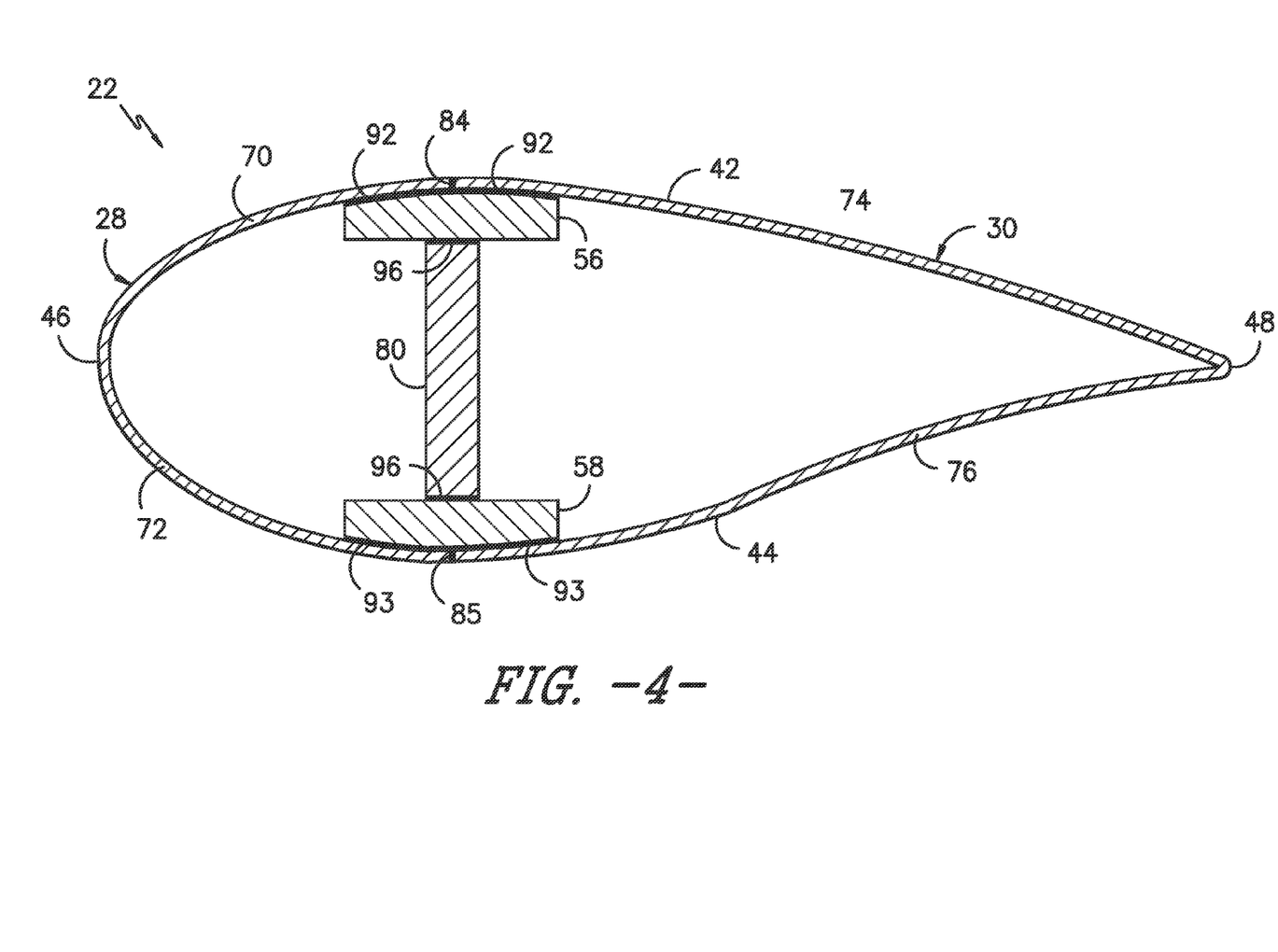
FIG. 4 illustrates a cross-sectional view of the modular rotor blade shown in FIG. 2 taken about line 4-4, particularly illustrating various joints that may be formed at the interface(s) defined between adjacent blade components of the modular rotor blade.
Figure 5:
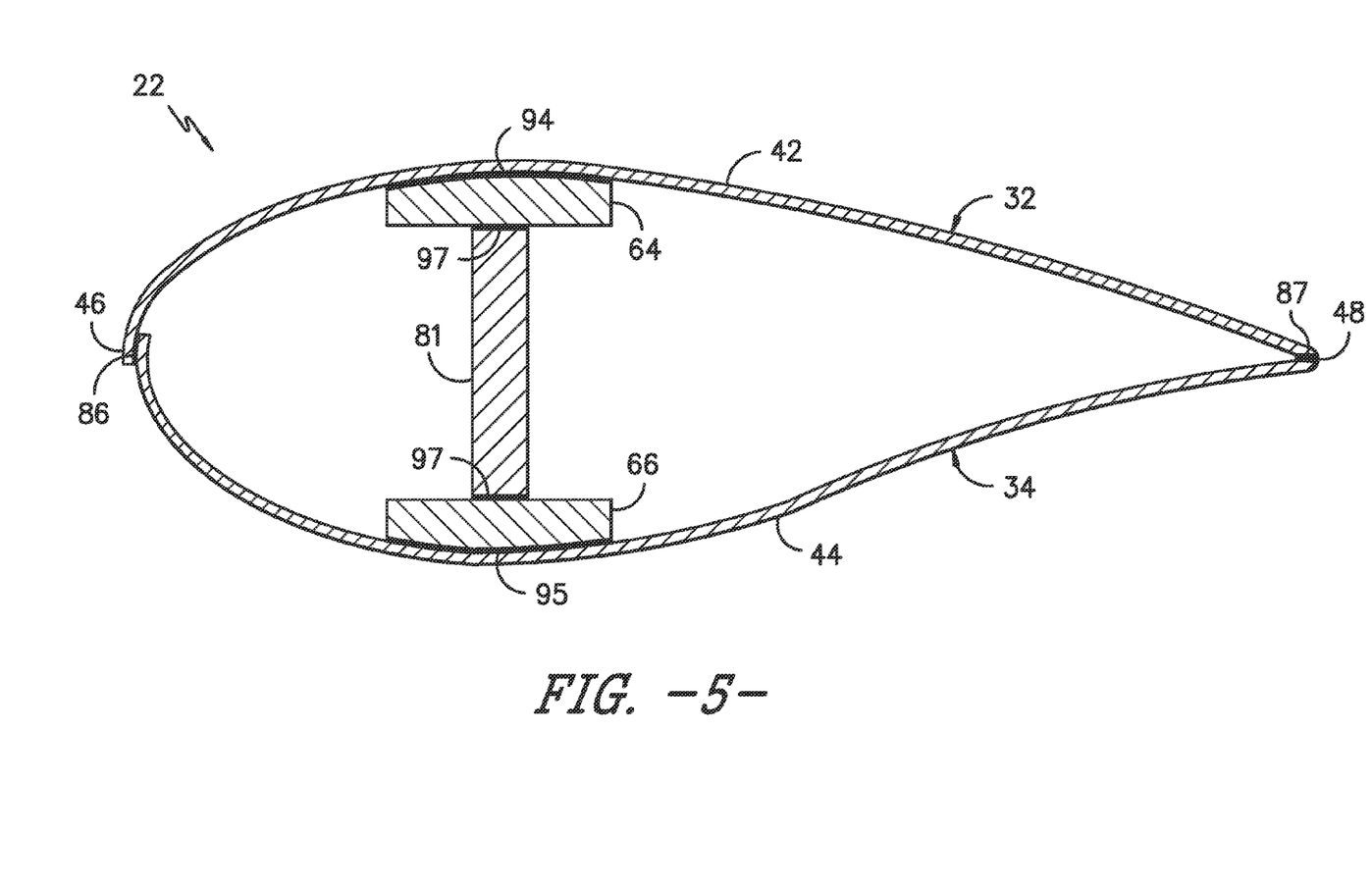
FIG. 5 illustrates another cross-sectional view of the modular rotor blade shown in FIG. 2 taken about line 5-5, particularly illustrating various other joints that may be formed at the interface(s) defined between adjacent blade components of the modular rotor blade.

Referring now to FIGS. 2-5, several views of a modular rotor blade 22 and/or components of a modular rotor blade 22 that may be utilized with the wind turbine 10 shown in FIG. 1 are illustrated in accordance with aspects of the present subject matter. Specifically, FIG. 2 illustrates an assembled, perspective view of the modular rotor blade 22 and FIG. 3 illustrates an exploded view of the rotor blade 22 shown in FIG. 2. Additionally, FIGS. 4 and 5 illustrate cross-sectional views of the rotor blade 22 shown in FIG. 2 taken about lines 4-4 and 5-5, respectively.

As shown, the rotor blade 22 has a modular configuration including a plurality of blade sections 24, 26, 28, 30, 32, 34 configured to be coupled together to form a complete rotor blade. For instance, in the illustrated embodiment, the rotor blade 22 includes a pre-formed blade root section 24, a pre-formed blade tip section 26 disposed opposite the blade root section 24 and a plurality of intermediate blade segments 28, 30, 32, 34 configured to be arranged between the blade root section 24 and the blade tip section 26 along a longitudinal axis 36 (FIG. 2) of the rotor blade 22. The blade root section 24 may generally be configured to define or form a blade root or root end 38 for coupling the rotor blade 22 to the hub 20 (FIG. 1) of the wind turbine 10. Similarly, the tip section 26 may generally define a blade tip or tip end 40 corresponding to the outermost portion of the rotor blade 22 along its longitudinal axis 36.

When assembled, the rotor blade 22 may generally define a substantially aerodynamic profile, such as by defining a symmetrical or cambered airfoil-shaped cross-section. For instance, as shown in FIGS. 4 and 5, the rotor blade 22 may define a pressure side 42 and a suction side 44 extending between leading and trailing edges 46, 48. Additionally, as particularly shown in FIG. 2, the assembled rotor blade 22 may generally have a span 50 defining the total length between the root end 38 and the tip end 40 of the blade 22 and a chord 52 defining the total length between the leading edge 46 and the trailing edge 48 of the blade 22. As is generally understood, the chord 52 may generally vary in length with respect to the span 50 as the rotor blade 22 extends from its root end 38 to its tip end 40.

As shown in FIG. 3, the blade root section 24 may generally include a root portion 54 and one or more continuous, longitudinal spar caps 56, 58 co-infused with the root portion 54, with the spar cap(s) 56, 58 generally extending outwardly from the root portion 54 in the spanwise direction of the rotor blade 22. The root portion 54 may extend lengthwise between the root end 38 of the blade root section 24 and an outboard end 60. Similarly, as shown in FIG. 3, the blade tip section 26 may generally include a tip portion 62 and one or more continuous, longitudinal spar caps 64, 66 co-infused with the tip portion 62, with the spar cap(s) 64, 66 generally extending outwardly from the tip portion 62 in the spanwise direction of the rotor blade 22. The tip portion 62 may extend lengthwise between an inboard end 68 and the tip end 40 of the blade tip section 26.

As indicated above, the rotor blade 22 may also include a plurality of intermediate blade segments 28, 30, 32, 34, 36 configured to be positioned between the root and tip sections 24, 26. For example, as shown in FIG. 3 and FIG. 4, the rotor blade 22 may include a plurality of leading edge segments 28 and a plurality of trailing edge segments 30 configured to be assembled between the blade root section 24 and the blade tip section 26 along the longitudinal axis 36 of the rotor blade 22. In such an embodiment, each leading edge segment 28 may be configured to define a spanwise section of the leading edge 46 of the rotor blade 22 and may include first and second side sections 70, 72 extending from the leading edge 46 so as to form portions of the pressure and suction sides 42, 44 of the rotor blade 22, respectively. Similarly, each trailing edge segment 30 may be configured to define a spanwise section of the trailing edge 48 of the rotor blade 22 and may include first and second side sections 74, 76 extending from the trailing edge 48 so as to form portions of the pressure and suction sides 42, 44 of the rotor blade 22, respectively. As such, to assemble the rotor blade 22, the side sections 70, 72 of each leading edge segment 28 may be configured to be coupled to the side sections 74, 76 of a corresponding trailing edge segment 30 at an interface defined between such components to form a spanwise section of the rotor blade 22 that includes complete pressure and suction sides 42, 44 extending between the leading and trailing edges 46, 48 of the blade 22. For instance, as particularly shown in FIG. 4, the side sections 70, 72, 74, 76 of the leading and trailing edge segments 28, 30 may be coupled together at pressure and suction side seams or joints 84, 85 that overlap the structural components of the rotor blade 22 (e.g., the spar caps 56, 58, 64, 66).

Moreover, as shown in FIGS. 3 and 5, in addition to the leading and trailing edge segments 28, 30, the rotor blade 22 may, in certain embodiments, also include at least one pressure side segment 32 and/or at least one suction side segment 34. In such embodiments, the pressure side segment(s) 32 may generally correspond to a spanwise section of the rotor blade 22 that extends between the leading and trailing edges 46, 48 so as to define the pressure side 42 of the blade 22. Similarly, the suction side segment(s) 34 may generally correspond to a spanwise section of the rotor blade 22 that extends between the leading and trailing edges 46, 48 so as to define the suction side 44 of the blade 22. As such, to assemble the rotor blade 22, each pressure side segment 32 may be coupled to a corresponding suction side segment 34 at the interface defined between such components at the leading and trailing edges 46, 48 of the rotor blade 22. For example, as particularly shown in FIG. 5, the pressure and suction side segments 32, 34 are coupled to one another at leading and trailing edge seams or joints 86, 87 formed at the leading and trailing edges 46, 48 of the rotor blade 22.

It should be appreciated that various other joints may be formed between the various adjacent blade segment/sections of the modular rotor blade 22. For example, as shown in FIG. 2, a joint(s) 88 may be formed at the interface(s) defined between the outboard end 60 of the root portion 54 of the blade root section 24 and the adjacent leading and trailing edge segments 28, 30. Similarly, a joint(s) 89 may be formed at the interface(s) defined between each pair of adjacent leading edge segments 28 and/or trailing edge segments 30. Moreover, as shown in FIG. 2, a joint(s) 90 may be formed at the interface(s) defined between the leading and trailing edge segments 28, 30 and each pressure side segment 32 and/or trailing edge segment 34. Similarly, a joint(s) 91 may be formed at the interface defined between the inboard end 68 of the tip portion 62 of the blade tip section 26 and the adjacent pressure and suction side segments 32, 34.

Referring still to FIGS. 2-5, the rotor blade 22 may also include one or more structural components configured to provide increased stiffness, buckling resistance and/or strength to the rotor blade 22. For example, as indicated above, the blade root section 24 may include opposed, longitudinally extending spar caps 56, 58 that are configured to extend outwardly from the root portion 54 of the blade root section 24 towards the blade tip section 26 along the spanwise direction of the rotor blade 22. Similarly, the blade tip section 26 may include two opposed, longitudinally extending spar caps 64, 66 configured to extend inwardly from the tip portion 62 of the blade tip section 26 towards the blade root section 24 along the spanwise direction of the rotor blade 22. In such embodiments, the blade root section 24 and the blade tip section 26 may be configured to be joined to one another via their respective spar caps 56, 58, 64, 66. For instance, in several embodiments, the outer ends of each blade root spar cap 56, 58 may be configured to be coupled to the inner ends of the corresponding blade tip spar cap 64, 66 at a spar cap joint 78 (FIG. 2) so as to couple the blade root section 24 to the blade tip section 26.

Additionally, the spar caps 56, 58, 64, 66 may be coupled to the intermediate blade segment(s) disposed immediately adjacent to the spar caps 56, 58, 64, 66 along the pressure and suction sides 42, 44 of the rotor blade 22. For example, as shown in FIG. 4, the blade root spar cap 56 extending along the pressure side 42 of the rotor blade 22 may be coupled to the leading and trailing edge segments 28, 30 at the interface defined between such components so as to form one or more first blade/spar joints 92 while the blade root spar cap 58 extending along the suction side 44 of the rotor blade 22 may be coupled to the leading and trailing edge segments 28, 30 at the interface defined between such components so as to form one or more second blade/spar joints 93. Similarly, as shown in FIG. 5, the blade tip spar cap 64 extending along the pressure side 42 of the rotor blade 22 may be coupled to the pressure side segment 32 at the interface defined between such components so as to form one or more third blade/spar joints 94 while the blade tip spar cap 66 extending along the suction side 44 of the rotor blade 22 may be coupled to the suction side segment 34 at the interface defined between such components so as to form one or more fourth blade/spar joints 95.

As shown in the illustrated embodiment, the rotor blade 22 may also include one or more shear webs 80, 81 configured to extend between the opposed blade root spar caps 56, 58 and/or between the opposed blade tip spar caps 64, 66. Specifically, as shown in FIG. 4, the rotor blade 22 may include a first shear web 80 configured to be coupled directly between the blade root spar caps 56, 58 such that a first shear web joint 96 is formed at each interface between the shear web 80 and one of the spar caps 56, 58. Similarly, as shown in FIG. 5, the rotor blade 22 may include a second shear web 81 configured to be coupled directly between the blade tip spar caps 64, 66 such that a second shear web joint 97 is formed at each interface between the shear web 81 and one of the spar caps 64, 66.

It should be appreciated that the rotor blade 22 may also include one or more additional structural components. For instance, as shown in FIGS. 2 and 3, the rotor blade 22 may include an auxiliary structural component 82 configured to be coupled to the root portion 54 of the blade root section 24 and extend outwardly therefrom in the spanwise direction of the rotor blade 22 at a location generally adjacent to the trailing edge 48 of the blade 22.

It should also be appreciated that, in alternative embodiments, the rotor blade 22 may have any other suitable modular configuration, including having any other suitable number and/or configuration of blade sections and/or blade segments. For instance, in one embodiment, the rotor blade 22 may only include leading and trailing edge segments 28, 30 positioned between the blade root and tip sections 24, 26. In another embodiment, the rotor blade 22 may only include pressure and suction side segments 32, 34 positioned between the blade root and tip sections 24, 26.

Figure 6:
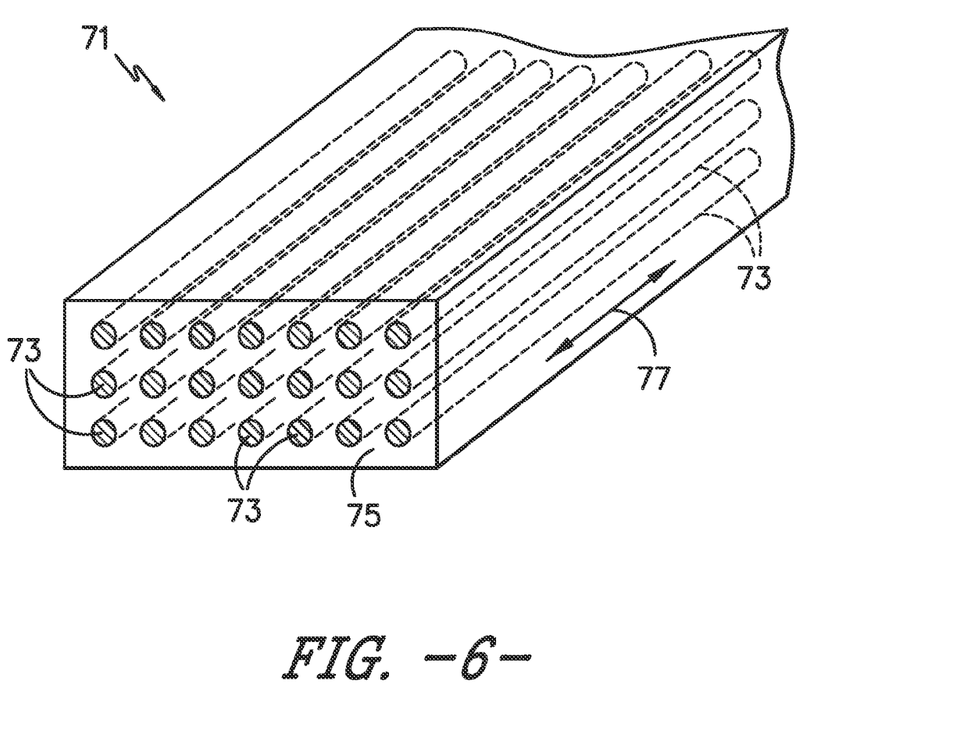
FIG. 6 illustrates a partial, perspective view of one embodiment of a suitable fiber-reinforced composite that may be used to form any of the blade components described herein.

In several embodiments, each blade component of the modular rotor blade 22 described above may be formed from a fiber-reinforced composite having a plurality of fibers surrounded by a suitable matrix material. For example, FIG. 6 illustrates a partial, perspective view of an example fiber-reinforced composite 71 that may be used to form any of the blade components described herein. As shown, the laminate composite 71 may include a plurality of fibers 73 (e.g., glass or carbon fibers) surrounded by or joined together via a resin matrix material 75. In the illustrated embodiment, the fibers 73 are unidirectional and, thus, are all oriented in a common fiber direction 77. However, in other embodiments, the fibers 73 may be oriented in two or more directions.

As indicated above, in several embodiments, the resin matrix material 75 may correspond to a thermoplastic resin material. In such embodiments, when adjacent blade components of a rotor blade are formed from composites including dissimilar thermoplastic resin materials, the blade components are typically not able to be effectively welded together at their interface via thermoplastic welding to form a corresponding joint between such adjacent components. As such, in accordance with aspects of the present subject matter, one or more additional layers of thermoplastic resin material may be provided at the interface defined between the adjacent components to allow a welded joint to be formed between the components.

Figure 7:
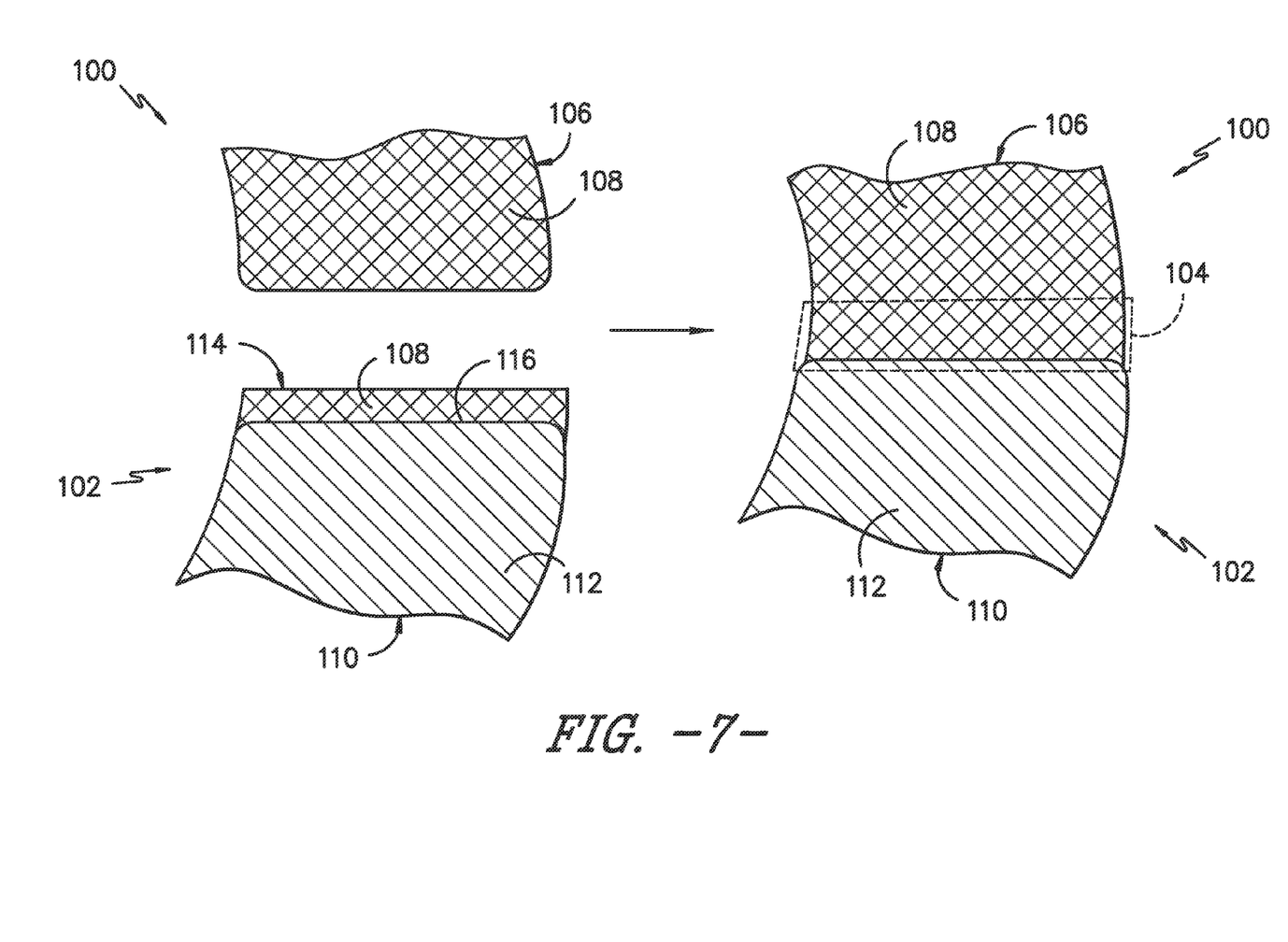
FIG. 7 illustrates a simplified, schematic view of one embodiment of portions of two blade components before and after such components have been welded together, particularly illustrating a thermoplastic resin coating applied on the exterior of one of the blade components to facilitate welding the components together.

Referring now to FIG. 7, a simplified view of one embodiment of a means for attaching first and second blade components 100, 102 of a rotor blade that are formed from dissimilar thermoplastic resin materials is illustrated in accordance with aspects of the present subject matter. As shown in FIG. 7, the first and second blade components 100, 102 may be welded together so as to form a welded joint (indicated by dashed lines 104) at the interface the defined between the blade components 100, 102. In several embodiments, the first blade component 102 may correspond to any suitable blade component, such as one of the blade components described above with reference to FIGS. 2-5 (e.g., the blade root section 24, blade tip section 26, one of the leading edge segments 28, one of the trailing edge segments 30, one of the pressure side segments 32, one of the suction side segments 34, one of the spar caps 56, 58, 64, 66 or one of the shear webs 80, 81. In such embodiments, the second blade component 102 may generally correspond to a blade component that is configured to be positioned adjacent to and/or otherwise coupled to the first blade component 100 at an interface defined between such blade components 100, 102. Thus, it should be appreciated that the welded joint 104 shown in FIG. 7 may generally correspond to any suitable attachment interface or joint of a rotor blade, such as any of the various joints 78, 84, 85, 86, 87, 88, 89, 90, 91, 92, 93, 94, 95, 96, 97 described above. For instance, if the first blade component 100 corresponds to the leading edge segment 28 shown in FIG. 2 through which line 4-4 passes, the second blade component 102 may correspond to the blade root section 24 (with the joint 104 corresponding to the joint 88 shown in FIG. 2), the adjacent trailing edge segment 30 (with the joint 104 corresponding to the joint 85 shown in FIG. 2, the adjacent leading edge segment 28 (with the joint 104 corresponding to the joint 89 shown in FIG. 2 or one of the adjacent spar caps 56, 58 (with the joint 104 corresponding to one of the joints 92, 93 shown in FIG. 4).

As shown in FIG. 7, the first blade component 100 is formed from a first fiber-reinforced composite 106 including a plurality of fibers (not shown) and a first matrix material, with the first matrix material primarily corresponding to a first thermoplastic resin material 108. Similarly, as shown in FIG. 7, the second blade component 102 is formed from a second fiber-reinforced composite 110 including a plurality of fibers (not shown) and a second matrix material, with the second matrix material primarily corresponding to a second thermoplastic resin material 112. In accordance with aspects of the present subject matter, the first thermoplastic resin material 108 is dissimilar from the second thermoplastic resin material 112 such that the first thermoplastic resin material 108 has a different resin chemistry than the second thermoplastic resin material 112. For instance, in a particular embodiment, the first thermoplastic resin material 108 may be a methacrylate-based resin and the second thermoplastic resin material 112 may be a PET-based resin.

It should be appreciated that, as used herein, a matrix material "primarily corresponds to" a particular thermoplastic resin material if more than 50% of the matrix material used to form the resulting fiber-reinforced material consists of such particular thermoplastic resin material. Thus, in the illustrated embodiment, the first matrix material primarily corresponds to the first thermoplastic resin material 108 if more than the 50% of the first matrix material used to form the resulting fiber-reinforced composite 106 corresponds the first thermoplastic resin material 108 (e.g., as opposed to the second thermoplastic resin material 110), such as by forming the fiber-reinforced composite 106 so that more than 60% of the first matrix material corresponds to the first thermoplastic resin material 108 or more than 70% of the first matrix material corresponds to the first thermoplastic resin material 108 or more than 80% of the first matrix material corresponds to the first thermoplastic resin material 108 or more than 90% of the first matrix material corresponds to the first thermoplastic resin material 108. Similarly, in the illustrated embodiment, the second matrix material primarily corresponds to the second thermoplastic resin material 112 if more than the 50% of the second matrix material used to form the resulting fiber-reinforced 110 corresponds the second thermoplastic resin material 112 (e.g., as opposed to the first thermoplastic resin material 108), such as by forming the fiber-reinforced composite 110 so that more than 60% of the second matrix material corresponds to the second thermoplastic resin material 112 or more than 70% of the second matrix material corresponds to the second thermoplastic resin material 112 or more than 80% of the second matrix material corresponds to the second thermoplastic resin material 112 or more than 90% of the second matrix material corresponds the second thermoplastic resin material 112.

In several embodiments, to allow a welded joint 104 to be formed between the first and second blade components 100, 102, a coating 114 including one or more layers of the first thermoplastic resin material 108 may be applied to the exterior of the second blade component. For instance, as shown in FIG. 7, the coating 114 may be applied to an exterior surface 116 of the pre-formed blade component 102. In one embodiment, such coating 114 may be applied to the exterior surface 116 of the second blade component 102 using a hand lay-up process in which one or more fabric plies are positioned along the exterior surface 116 of the second blade component 102, with the first thermoplastic resin material 108 then being applied onto the plies. Alternatively, a resin infusion process may be used to form the coating 114 onto the exterior of the second blade component 102. For example, after positioning one or more fabric plies along the exterior surface 116 of the second blade component 102, the first thermoplastic resin material 108 may be infused through the fabric plies to form the exterior coating 114.

By forming such a coating 114 along the exterior of the second blade component 102, the first thermoplastic resin material 108 included within the coating 114 may be welded to the first thermoplastic resin material 108 forming the first fiber-reinforced composite 108 to form the welded joint 104 at the interface defined between the components 102, 104. As such, a secure joint may be provided between the adjacent blade components 102, 104 without requiring adhesives or any additional processing.

It should be appreciated that, although the coating 114 is shown in FIG. 7 as being applied to the second blade component 102, a coating may similarly be applied to the first blade component 100 to allow a welded joint 104 to be formed between the blade components 100, 102. For instance, a coating including one or more layers of the second thermoplastic resin material 112 may be applied to the exterior of the first blade component 100, which may allow the second thermoplastic resin material 112 included within the coating to be welded to the second thermoplastic resin material 112 forming the second fiber-reinforced composite 110.

It should be appreciated that, although the coating 114 was described above as including one or more layers of the first thermoplastic resin material 108, the coating 114 may instead include a thermoplastic resin material that differs from both the first thermoplastic resin material 108 and the second thermoplastic resin material 112. For instance, the coating 114 may include one or more layers of a third thermoplastic resin material that is weld-compatible with one or both of the first and second thermoplastic resin materials 108, 112.

It should also be appreciated that, in one embodiment, the coating 114 may consist entirely of a thermoplastic resin material. Alternatively, the coating 114 may be fiber-reinforced and, thus, may include a plurality of fibers (e.g., carbon and/or glass fibers) surrounded by the thermoplastic resin material.

Figure 8:
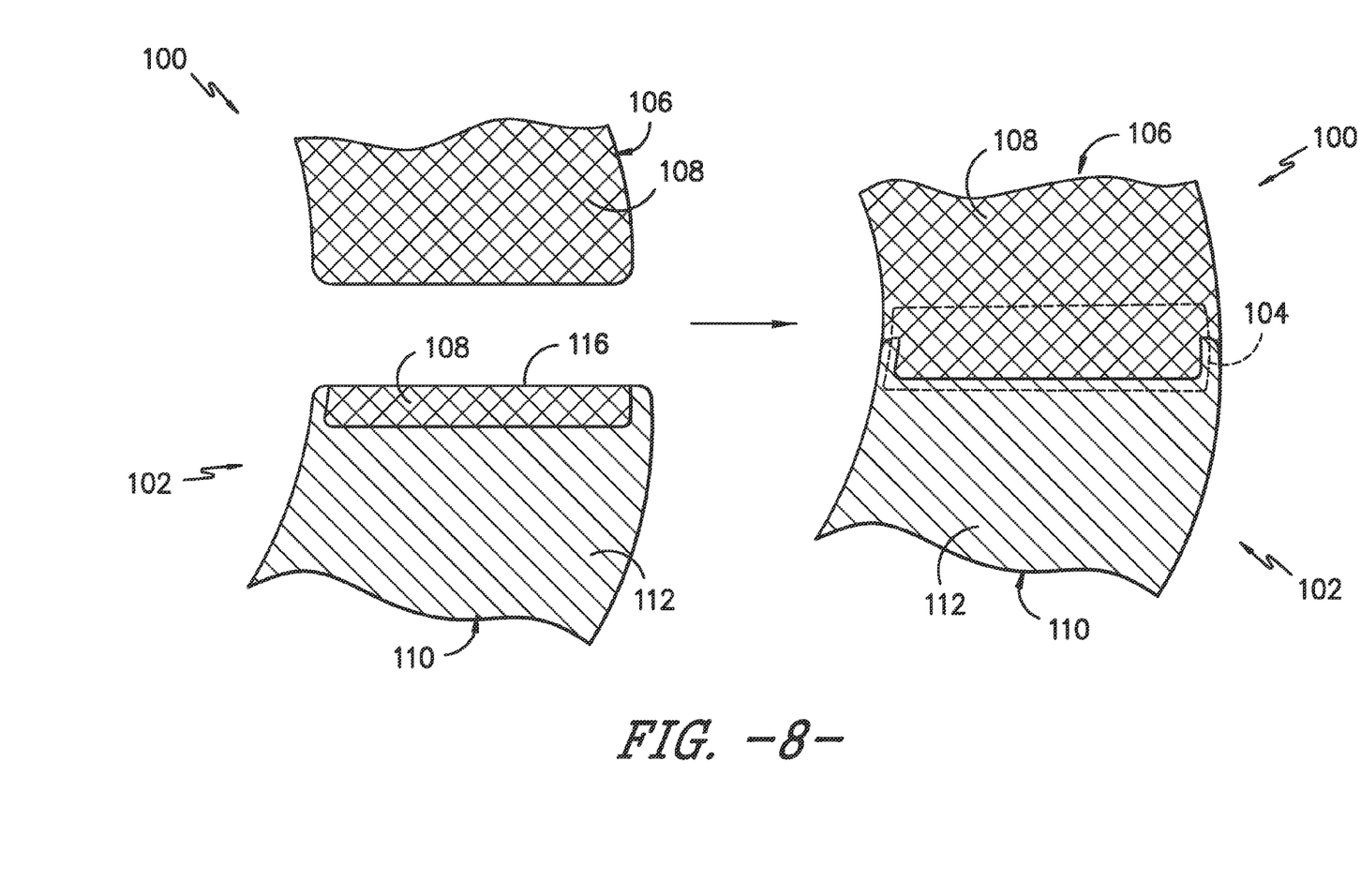
FIG. 8 illustrates a simplified, schematic view of another embodiment of portions of two blade components before and after such components have been welded together, particularly illustrating a layer(s) of a thermoplastic resin material integrated into one of the blade components to facilitate welding the components together.

Referring now to FIG. 8, a simplified view of another embodiment of a means for attaching the first and second blade components 100, 102 described above is illustrated in accordance with aspects of the present subject matter. As shown in FIG. 8, as opposed to applying an exterior coating 114 to the second blade component 102, one or more layers of the first thermoplastic resin material 108 may be integrated into the second fiber-reinforced composite 110 at a location adjacent to the portion of the exterior surface 116 of the second blade component 102 at which the welded joint 104 is to be formed. As such, when the blade components 100, 102 are positioned adjacent to one another at the joint interface, the first thermoplastic resin material 108 integrated into the second fiber-reinforced composite 110 may be welded to the first thermoplastic resin material 108 forming the first fiber-reinforced composite 106 to form the welded joint 104.

It should be appreciated that, in one embodiment, the first thermoplastic resin material 108 may be integrated into the second blade component 102 using any suitable means. For instance, in one embodiment, the first and second thermoplastic resin materials 108, 112 may be co-infused to form the second fiber-reinforced composite 110. Thus may be achieved, for example, using a pultrusion process in which fibers or fiber tows of two different wetted out fiber/resin mixtures are pulled through a heated die and allow to cure simultaneously. In such an embodiment, the fibers being impregnated with the first thermoplastic resin material 108 may be specifically positioned relative to the fibers being impregnated with the second thermoplastic resin material 112 (which may correspond to the majority of the fibers of the second fiber-reinforced composite 110) such that, when the impregnated fibers are pulled through the die, the first thermoplastic resin material 108 is positioned along the exterior of the pultruded product at the location of the anticipated joint for the blade components 100, 102.

It should be appreciated that, although the dissimilar resin material is shown in FIG. 8 as being integrated into the second blade component 102, the dissimilar resin material may, instead, be integrated into the first blade component 100 to allow a welded joint 104 to be formed between the blade components 100, 102. For instance, a small volume of the second thermoplastic resin material 112 may be integrated into the first fiber-reinforced composite 106, which may allow the second thermoplastic resin material 112 included within the first fiber-reinforced composite 106 to be welded to the second thermoplastic resin material 112 forming the second fiber-reinforced composite 110.

It should also be appreciated that, in alternative embodiments, a thermoplastic resin material that differs from both the first thermoplastic resin material 108 and the second thermoplastic resin material 112 may be integrated into the second blade component 102 (or the first blade component 100). For instance, one or more layers of a third thermoplastic resin material that is weld-compatible with one or both of the first and second thermoplastic resin materials 108, 112 may be integrated into the second blade component 102 (or the first blade component 100).

Additionally, it should be appreciated that, in one embodiment, the layer(s) of thermoplastic resin material integrated into the second blade component 102 (or the first blade component 100) may consist entirely of resin material. Alternatively, the layer(s) may be fiber-reinforced and, thus, may include a plurality of fibers (e.g., carbon and/or glass fibers) surrounded by the thermoplastic resin material.

Figure 9:
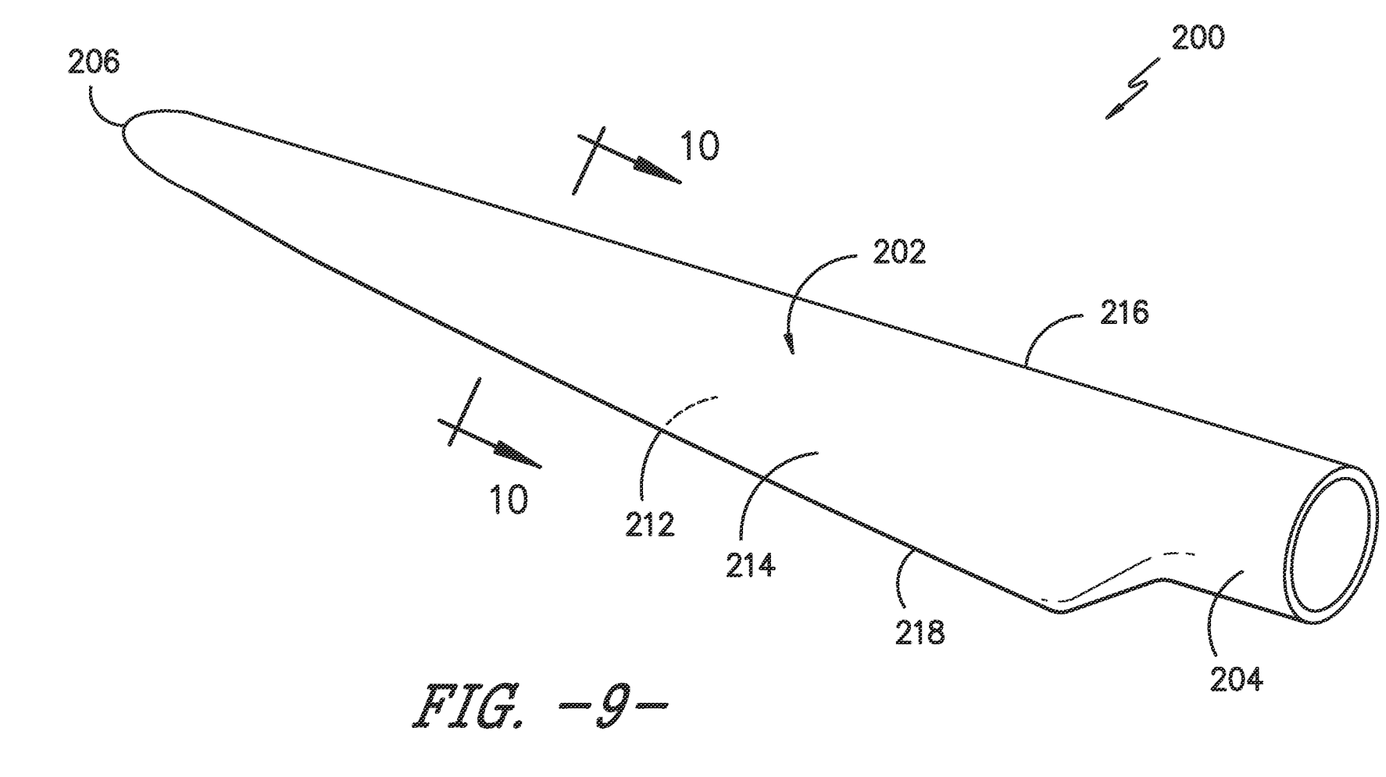
FIG. 9 illustrates a perspective view of one embodiment of a non-modular rotor blade in accordance with aspects of the present subject matter.
Figure 10:
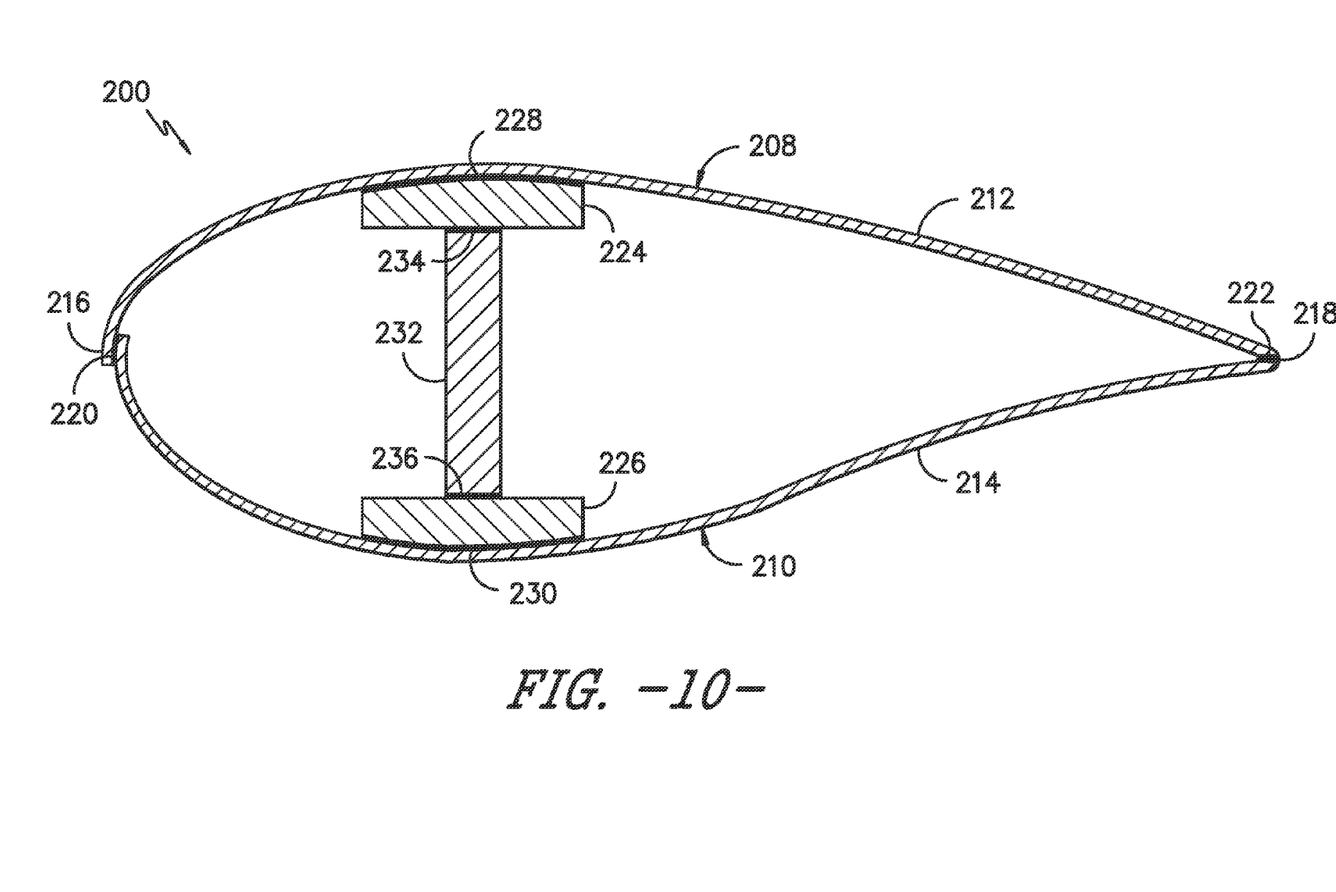
FIG. 10 illustrates a cross-sectional view of the rotor blade shown in FIG. 9 taken about line 10-10, particularly illustrating various joints that may be formed at the interface(s) defined between adjacent blade components of the rotor blade.

Moreover, it should be appreciated that, although the present subject matter has generally been described herein with reference to welding blade components of a modular rotor blade together, the subject matter may also be utilized to weld blade components of a conventional (or non-modular) rotor blade together. For instance, FIGS. 9 and 10 illustrate one embodiment of a non-modular rotor blade 200. Specifically, FIG. 9 illustrates a perspective view of the rotor blade 200 and FIG. 10 illustrates a cross-sectional view of the rotor blade 200 shown in FIG. 9 taken about line 10-10.

As shown, the rotor blade 200 includes a body shell 202 extending lengthwise or spanwise between a blade root 204 and an opposite blade tip 206, with the blade root 204 being configured to be coupled to the hub 20 (FIG. 1) of a corresponding wind turbine. As is generally understood, the body shell 202 may be formed from two separate shells, namely a pressure side shell 208 (FIG. 10) and a suction side shell 210 (FIG. 10). In such an embodiment, the pressure side shell 208 may generally be configured to define the pressure side 212 of the rotor blade 200 and the suction side shell 210 may generally be configured to define the suction side 214 of the rotor blade 200, with the pressure and suction sides shells 208, 210 being configured to be joined together at leading and trailing edges 216, 218 of the rotor blade. For instance, as shown in FIG. 10, a first edge joint 220 may be defined between the pressure and suction side shells 208, 210 at the leading edge 216 of the blade 200 and a second edge joint 222 may be defined between the pressure and suction side shells 208, 210 at the trailing edge 218 of the blade 200.

Additionally, the rotor blade 200 may also include one or more structural components. For instance, as shown in FIG. 10, the rotor blade 200 includes two longitudinally extending spar caps 224, 226 that are configured to extend spanwise along the pressure and suction side shells 208, 210 between the blade root 204 and the blade tip 206. In such an embodiment, a first blade/spar joint 228 may be defined between the pressure side spar cap 224 and the pressure side shell 208 and a second blade/spar joint 230 may be defined between the suction side spar cap 226 and the suction side shell 210. Moreover, the rotor blade 200 may also include a shear web(s) 232 extending between the opposed spar caps 224, 226, with a first shear web joint 234 being defined between the shear web 232 and the pressure side spar cap 224 and a second shear web joint 236 being defined between the shear web 232 and the suction side spar cap 226.

In accordance with aspects of the present subject matter, the first blade component 100 described above with reference to FIGS. 7 and 8 may correspond to one of the blade components of the rotor blade 200 shown in FIGS. 9 and 10 (e.g., the pressure side shell 208, the suction side shell 210, one of the spar caps 224, 226 or the shear web 232. In such an embodiment, the second blade component 102 described above with reference to FIGS. 7 and 8 may correspond to a blade component that is configured to be positioned adjacent to and/or otherwise coupled to the first blade component 100 at an interface defined between such blade components. For instance, if the first blade component 100 corresponds to the pressure side shell 208, the second blade component 102 may correspond to the suction side shell 210 or the pressure side spar cap 224. Thus, in instances in which two of the adjacent blade components of the rotor blade 200 shown in FIGS. 9 and 10 are formed from fiber-reinforced composites having differing or dissimilar thermoplastic resin materials, the various embodiments described herein may be utilized to form a welded joint between such adjacent components by providing one or more layers of a compatible or common thermoplastic resin material at the interface defined between the blade components.

It should be appreciated that the present subject matter is also directed to a method for assembling a rotor blade. In several embodiments, the method may include positioning a first blade component adjacent to a second blade component at a joint interface to be defined between the first and second blade components. As indicated above, in several embodiments, the first blade component 100 may formed from a first fiber-reinforced composite 106 including a first matrix material that primarily corresponds to a first thermoplastic resin material 108 and the second blade component 102 may be formed from a second fiber-reinforced composite 110 including a second matrix material that primarily corresponds to a second thermoplastic resin material 112, with the second thermoplastic resin material 112 differing from the first thermoplastic resin material 108. In addition, the method may include welding a portion of the first thermoplastic resin material of the first fiber-reinforced composite to at least one additional layer of thermoplastic resin material positioned on the second fiber-reinforced composite or integrated into the second fiber-reinforced composite at the joint interface so as to form a welded joint at the joint interface.

It should be appreciated that the thermoplastic materials described herein may welded together using any suitable welding device, means and/or method known in the art. For instance, suitable thermoplastic welding methods may include, but are not limited to, thermal welding, resistive welding, infrared welding, ultrasonic welding and/or chemical welding. Thermal welding may be achieved, for example, by heating the thermoplastic materials using a heat lamp, a laser light source, a heated flow of fluid and/or any other suitable heating device (e.g., a heat blanket or other conductive heating source).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
   a first blade component formed from a first fiber-reinforced composite including a first matrix material, the first matrix material primarily corresponding to a first thermoplastic resin material;
   a second blade component configured to be coupled to the first blade component at a joint interface, the second blade component formed from a second fiber-reinforced composite including a second matrix material, the second matrix material primarily corresponding to a second thermoplastic resin material, the second thermoplastic resin material having a resin chemistry that differs from the first thermoplastic resin material such that the first and second blade components are prevented from being effectively coupled together by thermoplastic welding; and
   at least one additional layer of thermoplastic resin material being applied onto the second fiber-reinforced composite or integrated into the second fiber-reinforced composite at the joint interface, the at least one additional layer of the thermoplastic resin material differing from the second thermoplastic resin material,
   wherein the first thermoplastic resin material of the first fiber-reinforced composite is welded to the at least one additional layer of the thermoplastic resin material to form a welded joint at the joint interface between the first blade component and the second blade component.

2. The rotor blade of claim 1, wherein the at least one additional layer of the thermoplastic resin material corresponds to a coating applied to an exterior surface of the second fiber-reinforced composite.

3. The rotor blade of claim 1, wherein the at least one additional layer of the thermoplastic resin material is co-infused into the second fiber-reinforced composite together with the second thermoplastic resin material.

4. The rotor blade of claim 1, wherein the at least one additional layer of the thermoplastic resin material corresponds to at least one additional layer of the first thermoplastic resin material.

5. The rotor blade of claim 1, wherein the at least one additional layer of the thermoplastic resin material is fiber-reinforced.

6. The rotor blade of claim 1, wherein the rotor blade corresponds to a modular rotor blade formed from a plurality of blade components, wherein the first blade component corresponds to a blade root section, a blade tip section, a leading edge segment, a trailing edge segment, a pressure side segment, a suction side segment, a spar cap or a shear web of the modular blade and wherein the second blade component comprises a blade component of the modular rotor blade configured to be coupled to the first blade component at the joint interface.

7. The rotor blade of claim 1, wherein the first blade component comprises one of a pressure side shell, a suction side shell, a spar cap or a shear web of the rotor blade and the second blade component comprises a blade component of the rotor blade configured to be coupled to the first blade component at the joint interface.

8. The rotor blade of claim 1, wherein the first thermoplastic resin material corresponds to a methacrylate-based resin material and the second thermoplastic resin corresponds to a PET-based resin material.

9. The rotor blade of claim 1, wherein more than 80% of the first matrix material corresponds to the first thermoplastic resin material and wherein more than 80% of the second matrix material corresponds to the second thermoplastic resin material.

10. A rotor blade for a wind turbine, the rotor blade comprising:
a first blade component formed from a first fiber-reinforced composite including a first matrix material, wherein more than 80% of the first matrix material corresponds to a first thermoplastic resin material;
a second blade component configured to be coupled to the first blade component at a joint interface, the second blade component formed from a second fiber-reinforced composite including a second matrix material, wherein more than 80% of the second matrix material corresponds to a second thermoplastic resin material, the second thermoplastic resin material having a different resin chemistry than the first thermoplastic resin material; and
at least one additional layer of thermoplastic resin material being applied onto the second fiber-reinforced composite or integrated into the second fiber-reinforced composite at the joint interface, the at least one additional layer of the thermoplastic resin material differing from the second thermoplastic resin material,
wherein the first thermoplastic resin material of the first fiber-reinforced composite is welded to the at least one additional layer of the thermoplastic resin material to form a welded joint at the joint interface between the first blade component and the second blade component.

11. The rotor blade of claim 10, wherein the at least one additional layer of the thermoplastic resin material corresponds to a coating applied to an exterior surface of the second fiber-reinforced composite.

12. The rotor blade of claim 10, wherein the at least one additional layer of the thermoplastic resin material is co-infused into the second fiber-reinforced composite together with the second thermoplastic resin material.

13. The rotor blade of claim 10, wherein the at least one additional layer of the thermoplastic resin material corresponds to at least one additional layer of the first thermoplastic resin material.

14. The rotor blade of claim 10, wherein the at least one additional layer of the thermoplastic resin material is fiber-reinforced.

15. The rotor blade of claim 10, wherein the rotor blade corresponds to a modular rotor blade formed from a plurality of blade components, wherein the first blade component corresponds to a blade root section, a blade tip section, a leading edge segment, a trailing edge segment, a pressure side segment, a suction side segment, a spar cap or a shear web of the modular blade and wherein the second blade component comprises a blade component of the modular rotor blade configured to be coupled to the first blade component at the joint interface.

16. The rotor blade of claim 10, wherein the first blade component comprises one of a pressure side shell, a suction side shell, a spar cap or a shear web of the rotor blade and the second blade component comprises a blade component of the rotor blade configured to be coupled to the first blade component at the joint interface.

17. The rotor blade of claim 10, wherein the first thermoplastic resin material corresponds to a methacrylate-based resin material and the second thermoplastic resin corresponds to a PET-based resin material.

18. The rotor blade of claim 10, wherein more than 90% of the first matrix material corresponds to the first thermoplastic resin material and wherein more than 90% of the second matrix material corresponds to the second thermoplastic resin material.

19. A method for assembling a rotor blade, the method comprising:
positioning a first blade component adjacent to a second blade component at a joint interface to be defined between the first and second blade components, the first blade component being formed from a first fiber-reinforced composite including a first matrix material that primarily corresponds to a first thermoplastic resin material, the second blade component being formed from a second fiber-reinforced composite including a second matrix material that primarily corresponds to a second thermoplastic resin material, wherein the second thermoplastic resin material having a resin chemistry that differs from the first thermoplastic resin material such that the first and second blade components are prevented from being effectively coupled together by thermoplastic welding; and
welding a portion of the first thermoplastic resin material of the first fiber-reinforced composite to at least one additional layer of thermoplastic resin material applied onto the second fiber-reinforced composite or integrated into the second fiber-reinforced composite at the joint interface so as to form a welded joint at the joint interface.

20. The method of claim 19, wherein the at least one additional layer of the thermoplastic resin material corresponds to at least one additional layer of the first thermoplastic resin material.

21. The method of claim 19, further comprising the step of co-infusing the at least one additional layer of the thermoplastic resin material into the second fiber-reinforced composite together with the second thermoplastic resin material before positioning the first blade component adjacent to the second blade component.

* * * * *